United States Patent Office 3,153,653
Patented Oct. 20, 1964

3,153,653
**2-(POLYFLUOROALIPHATIC THIO)-BENZO-
THIAZOLES AND -BENZOXAZOLES**
Maynard S. Raasch, Wilmington, Del., assignor to E. I.
du Pont de Nemours and Company, Wilmington, Del.,
a corporation of Delaware
No Drawing. Filed Jan. 11, 1963, Ser. No. 250,994
6 Claims. (Cl. 260—306)

This invention relates to 2-(polyfluoroaliphatic thio)-benzothiazoles and 2-(polyfluoroaliphatic thio)-benzoxazoles and to their preparation.

The new benzothiazoles and benzoxazoles are characterized by the formula

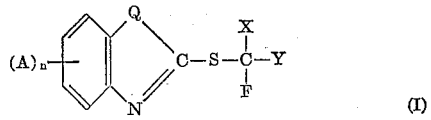

(I)

wherein A represents halogen (preferably chlorine or bromine), nitro, sulfo, or alkyl or alkoxy of up to 4 carbons (i.e., 4 carbons or less); $n$ is a cardinal number of up to 2; Q is oxygen or sulfur, i.e., a chalcogen of atomic number 8 to 16; X is F or perfluoroalkyl of up to 4 carbons; and Y contains up to 4 carbons and is hydrogen or acyclic halohydro carbon free of acetylenic unsaturation. Preferably, Y contains at most one ethylenic double bond and all Y halogens are of atomic number 9 to 17, i.e., fluorine or chlorine. Also. it is preferred that the alkyl, alkoxy, perfluoroalkyl and halohydrocarbon groups contain no more than 2 carbons each.

The compounds of this invention thus include the benzothiazoles and benzoxazoles of the formulas

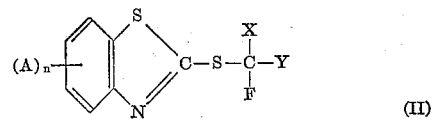

(II)

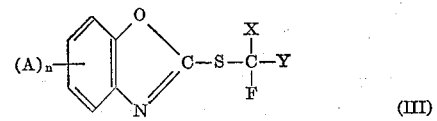

(III)

and of these, particularly preferred are those in which $n$ is zero, X is fluorine and Y is hydrogen, haloalkyl having at most one hydrogen and in which all halogens are of atomic number 9 to 17, or perhaloalkenyl in which all halogens are of atomic number 9 to 17.

The compounds of the present invention can be prepared by the reaction of a polyfluorine-containing halohydrocarbon with a salt, preferably an alkali metal salt, of a 2-mercaptobenzothiazole or 2-mercaptobenzoxazole of the formula

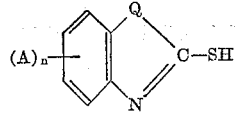

wherein A, $n$ and Q are as defined above. The halohydrocarbon reactants, which preferably do not contain more than 6 carbons, are represented by the following formulas:

Hal-CFXY and CFX=Z where X and Y are as previously defined, Hal is a halogen, preferably chlorine or bromine, and Z contains up to 4 carbons and is divalent acyclic halohydrocarbon free of acetylenic unsaturation, preferably perhaloalkylene. Particularly preferred Z groups are those of up to 2 carbons in which all halogens are of atomic number 9 to 17.

The reaction as above described can be conducted in any medium or under any conditions which bring the reactants into intimate contact, but it is much preferred that it be carried out in a polar liquid solvent. The solvent should be such that both of the reactants are soluble to the extent of at least 1% by weight at 100° C. Useful polar solvents are water-dimethylformamide, ethanol, methanol, acetone-water, cyclohexanol-water, dioxane-water, and cyclohexanone-water.

One of the reactants is a 2-mercaptide of benzothiazole or benzoxazole. This is prepared by the reaction of a 2-mercaptobenzothiazole or -benzoxazole with a base, usually in about stoichiometric amounts. The mercaptide can be preformed or can be formed in situ by adding a suitable base to the reaction mixture. The amount of base employed is not critical, but use of a 5–10% excess of base over benzothiazole or benzoxazole, as the case may be, aids the reaction and thus is preferred. The base used can be, e.g., a sodium, potassium, lithium or quaternary ammonium (e.g., tetramethylammonium) hydroxide, carbonate or alkoxide such as sodium methoxide or sodium ethoxide.

The amount of the halohydrocarbon should generally be at least stoichiometrically equivalent to the mercaptide. It is preferable to use a considerable excess, e.g., 20 to 50 mole per cent, to obtain maximum yields.

The reaction can be conducted at room temperatures or at any temperature desired up to the decomposition temperatures of the components of the system, but as a practical matter it is ordinarily preferred, as in many organic reactions, to conduct the reaction at a temperature between about 60° and 200° C. The reaction proceeds most expeditiously under some pressure, and pressures from about 1 to 10 atmospheres can be used with advantage. For practical reasons, it will usually be preferred to use a pressure from about 1 to 5 atmospheres, gauge.

The reaction time will vary depending upon the specific conditions selected but will ordinarily run about 1 to 16 hours.

The compounds prepared as described above can be isolated in any appropriate way, for instance, by diluting the reaction mixture with from 1 to 5 volumes of water. The product separates from the solution. After collecting and drying, one can use the product directly without further purification. Refined products can be obtained by conventional distillation or crystallization techniques.

One convenient procedure for preparing the new compounds involves placing the solvent, e.g., methanol, ethanol or dimethylformamide, sodium alcoholate and 2-mercaptobenzothiazole in a reaction bomb and then passing in the haloalkane in 20 to 40% excess of the calculated amount. The bomb is then heated slowly to 80 to 150° C. and maintained at that temperature for 1 to 5 hours or until the reaction is completed. The alcohol solvent, unreacted 2-mercaptobenzothiazole (and halogenated alkanes) and sodium halide formed during the reaction are removed. Essentially pure compounds of this invention remain as residue.

For certain compounds of this invention, the preferred procedure involves heating a bomb reactor containing a 10 to 50% excess of halogenated olefin, 2-mercaptobenzothiazole, and a base such as sodium hydroxide or potassium hydroxide in solvents such as dimethylformamide, ethanol or methanol at 50° to 125° C., until the reaction is complete. The mixture is cooled, filtered, stripped of solvent and washed with aqueous alkali (as NaOH) to remove unreacted 2-mercaptobenzothiazole. Essentially pure compounds of this invention remain as the water-insoluble portion.

The following examples illustrate the preparation and properties of new compounds of this invention.

EXAMPLE I

*2-(Difluoromethylthio)Benzothiazole*

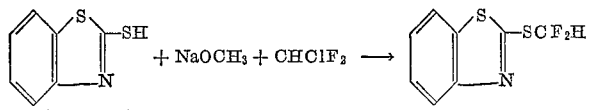

A mixture of 84 parts by weight of 2-mercaptobenzothiazole, 320 parts by weight of methanol, 27 parts by weight of sodium methylate, and 60 parts by weight of chlorodifluoromethane was heated at 120° C. for 5 hours in a bomb. The sodium chloride was filtered from the product and the methanol evaporated. The residue was taken up in ether, washed with 5% sodium hydroxide, dried and distilled to give 29 parts of 2-(difluoromethylthio)benzothiazole, B.P. 70–75° C./0.1 mm., $n_D^{25}$ 1.6088. The distillate crystallized after cooling to about −80° C. and was recrystallized from petroleum ether to give 23 parts, M.P. 31–32° C.

*Analysis.*—Calcd. for $C_8H_5F_2NS_2$: C, 44.22; H, 2.32; F, 17.49. Found: C, 44.96; H, 2.56; F, 18.11.

Repetition of the above with minor variations gave an increased yield as shown by the following:

A mixture of 84 parts by weight of 2-mercaptobenzothiazole, 150 parts by weight of dioxane, 100 parts by weight of water and 20 parts by weight of sodium hydroxide was charged into a stainless steel bomb. The bomb was cooled, evacuated of gases, and charged with 60 parts by weight of chlorodifluoromethane. The mixture was heated to 100° C. for six hours with agitation, cooled and vented. The product consisted of two layers. The organic layer was washed with water, dried over magnesium sulfate and distilled through a Vigreux column to give a 71% yield of 2-(difluoromethylthio)benzothiazole, B.P. 92–94° C. at 1 mm. The distillate solidified and melted at 35° C. after blotting on paper. The identity of the product was further confirmed by infrared analysis.

EXAMPLE II

*2-(Difluoromethylthio)-6-Methylbenzothiazole*

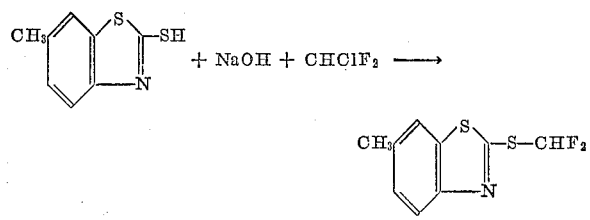

The general procedure of Example I was employed with the following materials and time:

136 g. 6-methyl-2-mercaptobenzothiazole
33 g. sodium hydroxide
150 ml. water
225 ml. dioxane
90 g. chlorodifluoromethane
6 hours, 100° C.

The product was diluted with 300 ml. of water and the organic layer was separated, washed with 5% potassium hydroxide, dried and distilled through a Vigreux column. The yield of 2-(difluoromethylthio)-6-methyl-benzothiazole was 67 g. (39%), B.P. 121–123° C./2 mm. The crystalline compound was recrystallized from hexane by cooling the hexane solution in solid carbon dioxide. There was obtained 59 g., melting at 34–34.5° C.

*Analysis.*—Calcd. for $C_9H_7F_2NS_2$: C, 46.73; H, 3.06; F, 16.43. Found: C, 46.89; H, 3.08; F, 16.80.

EXAMPLE III

*2-(Difluoromethylthio)Benzoxazole*

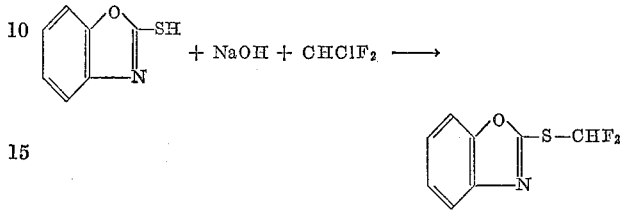

The general procedure of Example I was repeated using the following:

50 g. 2-mercaptobenzoxazole
13.3 g. sodium hydroxide
75 ml. water
115 ml. dioxane
40 g. chlorodifluoromethane
6 hours, 100° C.

The product was distilled twice through a column. It boiled at 47–50° C./0.2–0.5 mm., $n_D^{25}$ 1.5508. The yield was 27 g.

*Analysis.*—Calcd. for $C_8H_5F_2NOS$: C, 47.76; H, 2.51; F, 18.88. Found: C, 48.43; H, 2.87; F, 18.47.

EXAMPLE IV

*2-(1,1,2,2-Tetrafluoroethylthio)Benzothiazole*

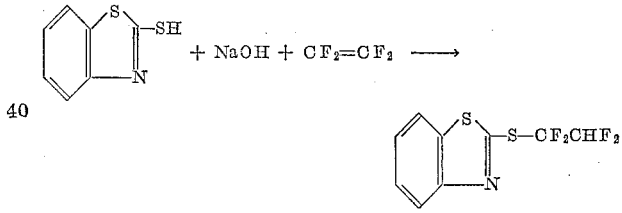

The general procedure of Example I was repeated using the following:

67 g. 2-mercaptobenzothiazole
16 g. sodium hydroxide
75 ml. water
85 ml. dioxane
40 g. tetrafluoroethylene
4 hours, 100° C.

The oil phase of the product was separated, diluted to 500 ml. with ether and filtered from solids. The ether layer was washed with 5% sodium hydroxide, dried and distilled. The yield of 2-(1,1,2,2-tetrafluoroethylthio) benzothiazole was 59 g. (55%); B.P. 109–111° C./1 mm. The distillate crystallized and was recrystallized from petroleum ether by dissolving and cooling to −15° C. The product melted at 49–50.5° C.

*Analysis.*—Calcd. for $C_9H_5F_4NS_2$: C, 40.44; H, 1.89; F, 28.43. Found: C, 40.64; H, 1.90; F, 28.63.

EXAMPLE V

*2-(2-Chloro-1,1,2-Trifluoroethylthio)Benzothiazole*

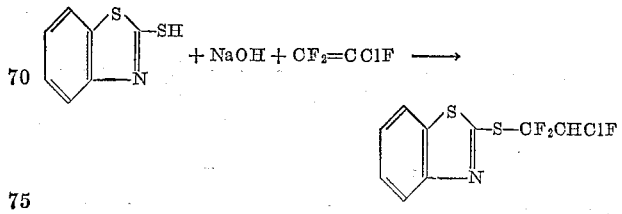

The general process of Example I was employed using:

84 g. 2-mercaptobenzothiazole
20 g. sodium hydroxide
200 ml. water
300 ml. dioxane
80 g. chlorotrifluoroethylene
4 hours, 100° C.

The yield of 2-(2-chloro-1,1,2-trifluoroethylthio)-benzothiazole was 97 g. (68%), B.P. 126–128° C./2 mm. The distillate solidified and melted at 40.5–41.5° C. After recrystallization from petroleum ether, it melted at 41–42° C.

Analysis.—Calcd. for $C_9H_5ClF_3NS_2$: C, 38.10; H, 1.78; Cl, 12.50; F, 20.10. Found: C, 38.23; H, 2.00; Cl, 12.48; F, 20.40.

EXAMPLE VI 2-(2,2-Dichloro-1,1-Difluoroethylthio)Benzothiazole

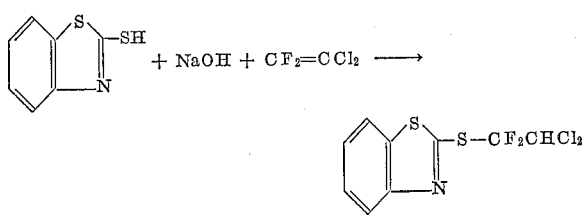

The general procedure of Example I was employed with the following:

134 g. 2-mercaptobenzothiazole
32 g. sodium hydroxide
160 ml. water
160 ml. dioxane
120 g. 1,1-difluoro-2,2-dichloroethylene
4 hours, 100° C.

The product was diluted with 400 ml. of water, filtered and the organic material distilled in a simple still to give 106 g. (44% yield) of 2-(2,2-dichloro-1,1-difluoroethylthio)benzothiazole, boiling at 151–155° C. /2 mm. The crystallized distillate was recrystallized from hexane to give 90 g., melting at 63° C.

Analysis.—Calcd. for $C_9H_5Cl_2F_2NS_2$: C, 36.01; H, 1.68; F, 12.66. Found: C, 36.12; H, 1.72; F, 13.25.

EXAMPLE VII 2-(1-Difluoromethyl-1,2,2,2-Tetrafluoroethylthio)Benzothiazole

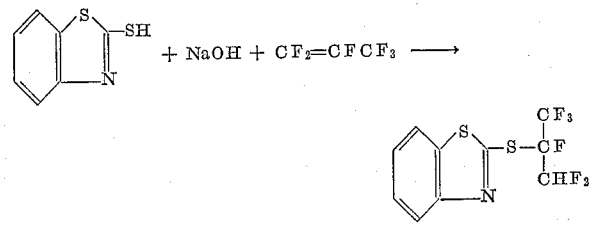

The general procedure of Example I was employed with the following:

50 g. 2-mercaptobenzothiazole
12 g. sodium hydroxide
120 ml. water
180 ml. dioxane
60 g. hexafluoropropene
4 hours, 100° C.

After separation and distillation there was obtained 65 g., B.P. 105° C./1.5 mm., $n_D^{25}$ 1.5201, and 5 g., boiling at 105–108° C./15 mm. Sstructural assignment was based on n-m-r examination.

Analysis.—Calcd. for $C_{10}H_5F_6NS_2$: C, 37.84; H, 1.59; F, 35.93. Found: C, 38.33; H, 2.03; F, 34.95.

EXAMPLE VIII 2-(2-Chloro-1,1,2-Trifluoroethylthio)-6-Methylbenzothiazole

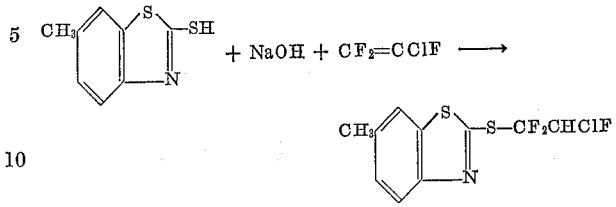

The general procedure of Example I was repeated using the following:

91 g. 2-mercapto-6-methylbenzothiazole
20 g. sodium hydroxide
300 ml. water
70 g. chlorotrifluoroethylene
4 hours, 100° C.

Distillation gave 40 g. (27% yield) of 2-(2-chloro-1,1,2-trifluoroethylthio)-6-methylbenzothiazole, boiling at 152° C./2.5 mm. The product was recrystallized from hexane to give 36 g., M.P. 71–72° C.

Analysis.—Calcd. for $C_{10}H_7ClF_3NS_2$: C, 40.32; H, 2.37; F, 19.14. Found: C, 41.08; H, 2.58; F, 18.86.

EXAMPLE IX 2-(2-Chloro-1,1,2-Trifluoroethylthio)-6-Nitrobenzothiazole

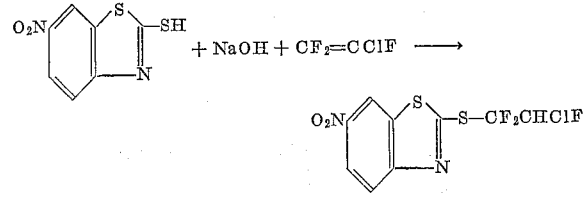

The general procedure of Example I was repeated using the following:

47 g. 2-mercapto-6-nitrobenzothiazole
9 g. sodium hydroxide
100 ml. water
150 ml. dioxane
35 g. chlorotrifluoroethylene
4 hours, 100° C.

The oil phase of the product was separated and dissolved in ether and washed with 5% sodium hydroxide. Evaporation of the ether left a sticky, low-melting solid which was recrystallized first from butyl alcohol and then several times from ethanol to give 11 g. of 2-(2-chloro-1,1,2-trifluoroethylthio)-6-nitrobenzothiazole, melting at 42–44° C.

Analysis.—Calcd. for $C_9H_4ClF_3N_2O_2S_2$: C, 32.88; H, 1.23; F, 17.35. Found: C, 33.04; H, 1.34; F, 17.57.

EXAMPLE X 2-(2-Chloro-1,1,2-Trifluoroethylthio)Benzoxazole

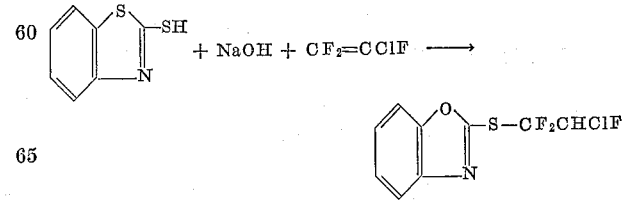

The general procedure of Example I was repeated using the following:

50 g. 2-mercaptobenzoxazole
13.3 g. sodium hydroxide
75 ml. water
115 ml. dioxane
50 g. chlorotrifluoroethylene
4 hours, 100° C.

Distillation gave 44 g. (50% yield) of 2-(2-chloro-1,1,2-trifluoroethylthio)benzoxazole, B.P. 96–99° C./1.5 mm., $n_D^{25}$ 1.5371–1.5376.

*Analysis.*—Calcd. for $C_9H_5ClF_3NOS$: C, 40.38; H, 1.88; F, 21.30. Found: C, 41.18; H, 2.28; F, 21.04.

EXAMPLE XI

*2-(Pentafluoroallylthio)Benzothiazole*

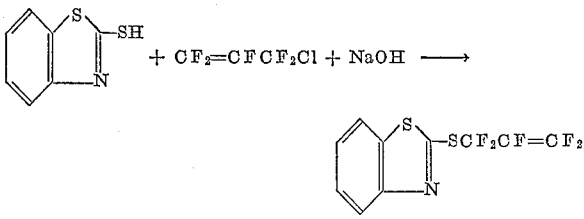

A solution containing 16.7 g. of 2-mercaptobenzothiazole, 20 ml. of water, 4 g. of sodium hydroxide, and 80 ml. of dioxane was cooled to 0° C. and 22 g. of 75% perfluoroallyl chloride was added. The solution was stirred at 5° C. for one hour and then allowed to warm to room temperature. When the mixture was diluted with water, an oil separated. This was removed and the aqueous layer was extracted once with ether. This was added to the oil and the ether solution was then dried and distilled. There was obtained 3.38 g. of 2-(pentafluoroallylthio)benzothiazole, B.P. 96–97° C./1 mm., $n_D^{25}$ 1.5463.

*Analysis.*—Calcd. for $C_{10}H_4F_5NS_2$: C, 40.39; H, 1.34; F, 31.95. Found: C, 40.55; H, 1.73; F, 32.41.

Similarly, reaction of chlorotrifluoroethylene with 6-ethoxybenzoxazole yields 2-(2-chloro-1,1,2-trifluoroethylthio)-6-ethoxybenzoxazole and reaction of tetrafluoroethylene with 6-butylbenzothiazole gives 2-(1,1,2,2-tetrafluoroethylthio)-6-butylbenzothiazole. When the general procedure of Example VII is repeated with perfluorohexene-1 and benzothiazole there is produced 2-(1-trifluoromethyl-1,2,2,3,3,4,4,5,5,5-decafluoropentylthio)benzothiazole.

EXAMPLE XII

*2-(Difluoromethylthio)-6-Methoxybenzothiazole*

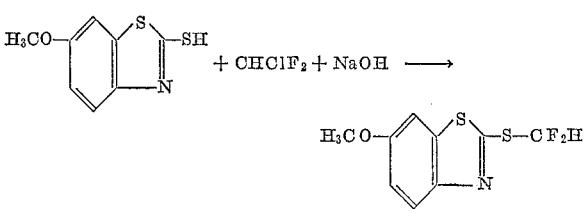

When the general procedure of the preceding examples was repeated using equivalent amounts of chlorodifluoromethane and 2-mercapto-6-methoxybenzothiazole there was obtained 2-(difluoromethylthio)-6-methoxybenzothiazole, $n_D^{25}$ 1.6078.

*Analysis.*—Calcd. for $C_9H_7F_2NOS_2$: C, 41.3; H, 2.2; F, 16.3. Found: C, 42.2; H, 2.7; F, 16.8.

EXAMPLE XIII

*2-(Difluoromethylthio)-5,6-Dichlorobenzothiazole*

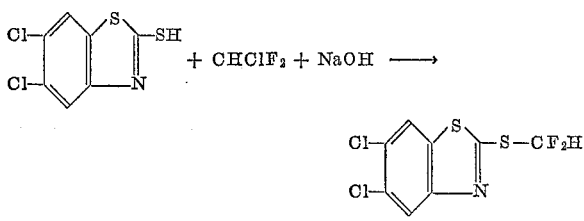

When the process of the preceding example was repeated using equivalent amounts of chlorodifluoromethane and 2-mercapto-5,6-dichlorobenzothiazole, there resulted 2-(difluoromethylthio)-5,6-dichlorobenzothiazole, $n_D^{25}$ 1.6325.

*Analysis.*—Calcd. for $C_8H_3F_2Cl_2NS_2$: S, 22.5. Found: S, 22.1.

EXAMPLE XIV

*2-(Difluoromethylthio)-5-Chlorobenzothiazole*

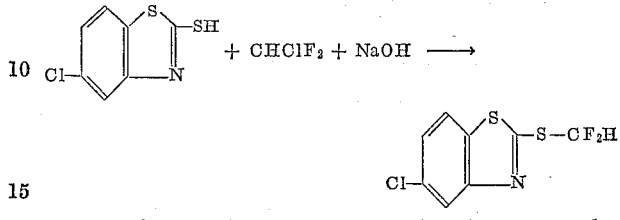

Repetition of the procedure of the above examples using chlorodifloromethane and 5-chlorobenzothiazole, there was obtained 2-(difluoromethylthio)-5-chlorobenzothiazole, $n_D^{25}$ 1.6259.

*Analysis.*—Calcd. for $C_8H_4F_2ClNS_2$: C, 38.1; H, 1.6; F, 15.1. Found: C, 38.7; H, 1.8; F, 14.4.

EXAMPLE XV

*2-(Difluoromethylthio)-6-Chlorobenzothiazole*

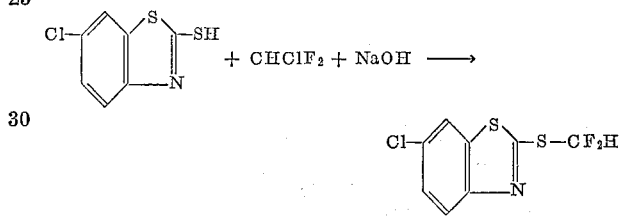

When the process of the preceding examples was repeated using chlorodifluoromethane and 6-chloro-2-mercaptobenzothiazole in equivalent amounts there was obtained 2-(difluoromethylthio)-6-chlorobenzothiazole, M.P. 53–55° C.

*Analysis.*—Calcd. for $C_8H_4F_2ClNS_2$: C, 38.1; H, 1.6; S, 25.6. Found: C, 38.5; H, 1.7; S, 25.7.

EXAMPLE XVI

*Sodium Salt of 2-(Difluoromethylthio)Benzothiazole-6-Sulfonic Acid*

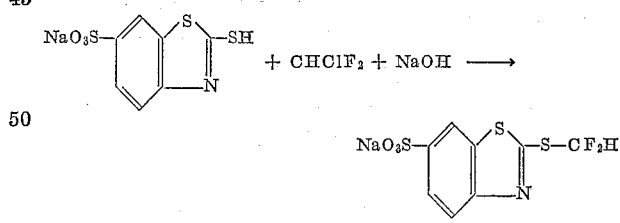

When the process of the above examples was repeated using equivalent amounts of chlorodifluoromethane and the sodium salt of 2-mercaptobenzothiazole-6-sulfonic acid, there was obtained the corresponding sodium salt of the 2-(difluoromethylthio)benzothiazole having a sulfonic acid group in the 6-position. The compound melted at 300° C.

*Analysis.*—Calcd. for $C_8H_4F_2NO_3S_3Na$: C, 30.1; H, 1.3. Found: C, 30.4; H, 1.5.

The new compounds of this invention at a concentration of about 0.2 g./l. act as brightening agents in the electroplating of copper in an acid copper sulfate bath. They are also useful as nematocides, e.g., in nursery stock. When applied to soil at a rate of 5–100 pounds per acre, they control the root knot nematode.

This application is a continuation-in-part of my prior copending application Serial No. 819,533, filed June 19, 1959, and now abandoned, which is a continuation-in-part of Serial No. 753,131, and now abandoned, filed August 4, 1958.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula:

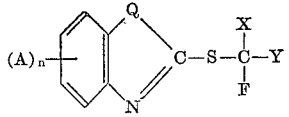

wherein
A is of the group consisting of halogen, nitro, sulfo, and alkyl and alkoxy of up to 4 carbons,
$n$ is a cardinal number of up to 2,
Q is a chalcogen of atomic number 8 to 16,
X is of the group consisting of fluorine and perfluoroalkyl of up to 4 carbons, and
Y contains up to 4 carbons and is of the group consisting of hydrogen and acyclic halohydrocarbon free of acetylenic unsaturation.

2. 2-(difluoromethylthio)benzothiazole.
3. 2-(difluoromethylthio)benzoxazole.
4. 2-(1,1,2,2-tetrafluoroethylthio)benzothiazole.
5. 2-(2-chloro-1,1,2-trifluoroethylthio)benzothiazole.
6. 2-(2,2-dichloro-1,1-difluoroethylthio)benzothiazole.

References Cited in the file of this patent
FOREIGN PATENTS
535,580    Canada _____ Jan. 8, 1957